(12) United States Patent
Trimmer et al.

(10) Patent No.: US 7,976,694 B2
(45) Date of Patent: Jul. 12, 2011

(54) APPARATUS AND METHOD FOR HYBRID MACHINING A CONTOURED, THIN-WALLED WORKPIECE

(75) Inventors: Andrew Lee Trimmer, Latham, NY (US); Nicholas Joseph Kray, Blue Ash, OH (US); Joshua Leigh Miller, West Chester, OH (US); Michael Scott Lamphere, Hooksett, NH (US); Bin Wei, Mechanicville, NY (US)

(73) Assignee: General Electric Company, Niskayuna, NY (US)

( * ) Notice: Subject to any disclaimer, the term of this patent is extended or adjusted under 35 U.S.C. 154(b) by 1028 days.

(21) Appl. No.: 11/779,066

(22) Filed: Jul. 17, 2007

(65) Prior Publication Data

US 2009/0020509 A1    Jan. 22, 2009

(51) Int. Cl.
*B23H 5/06* (2006.01)
*B23H 9/10* (2006.01)

(52) U.S. Cl. .............. 205/662; 205/663; 219/69.17

(58) Field of Classification Search .......... 219/69.11, 219/69.14, 69.17; 205/662, 663, 668, 652, 205/653

See application file for complete search history.

(56) References Cited

U.S. PATENT DOCUMENTS

| | | | |
|---|---|---|---|
| 3,420,759 A | | 1/1969 | Inoue |
| 3,630,877 A | * | 12/1971 | Koike et al. ............. 204/224 M |
| 3,816,693 A | * | 6/1974 | Braun ..................... 219/69.2 |
| 4,208,256 A | * | 6/1980 | Inoue ..................... 205/641 |
| 4,641,007 A | * | 2/1987 | Lach ...................... 219/69.17 |
| 4,860,616 A | * | 8/1989 | Smith ..................... 219/69.17 |
| 5,108,561 A | * | 4/1992 | Kuromatsu ................ 205/663 |
| 5,171,408 A | | 12/1992 | Thornton |
| 5,688,392 A | * | 11/1997 | White ..................... 205/654 |
| 6,200,439 B1 | | 3/2001 | Wei et al. |
| 6,267,868 B1 | | 7/2001 | Wei et al. |
| 6,562,227 B2 | | 5/2003 | Lamphere et al. |
| 6,627,054 B2 | | 9/2003 | Wei et al. |
| 6,787,728 B2 | | 9/2004 | Wei et al. |
| 6,968,290 B2 | | 11/2005 | Wei et al. |
| 7,741,576 B2 | * | 6/2010 | Trimmer et al. .......... 219/69.17 |
| 2003/0024825 A1 | | 2/2003 | Lamphere et al. |
| 2003/0077340 A1 | | 4/2003 | Rao et al. |
| 2004/0047880 A1 | | 3/2004 | DeBolle et al. |
| 2005/0247569 A1 | * | 11/2005 | Lamphere et al. .......... 205/663 |
| 2006/0249398 A1 | * | 11/2006 | Becker ..................... 205/663 |
| 2008/0277384 A1 | * | 11/2008 | Trimmer et al. ........... 219/69.17 |

FOREIGN PATENT DOCUMENTS

WO    2007074012    7/2007

OTHER PUBLICATIONS

225142, PCT International Search Report, Sep. 30, 2008.
PCT/US2008/065866, Written Opinion, Sep. 30, 2008.

* cited by examiner

*Primary Examiner* — Geoffrey S Evans
(74) *Attorney, Agent, or Firm* — Penny A. Clarke

(57) ABSTRACT

An apparatus and method for hybrid machining a workpiece is disclosed. The workpiece is powered as an anode, a cutter is powered as a cathode and a cutting fluid or coolant is circulated therebetween. The cutter is made of a conductive material and a non-conductive abrasive material. The hybrid machine performs a roughing pass machining operation in which material is removed from the workpiece at a relatively high rate using a high-speed electro-erosion (HSEE) process. Then, the hybrid machine performs a finish pass machining operation in which material is removed from the workpiece using precision electro-grinding (PEG) process at a different differential electrical potential and/or flushing rate than the roughing pass machining operation to provide a smooth finish without thermal effects on the workpiece.

19 Claims, 5 Drawing Sheets

APPARATUS AND METHOD FOR HYBRID MACHINING A CONTOURED, THIN-WALLED WORKPIECE

CROSS-NOTING TO RELATED APPLICATIONS

This application is related to application Ser. No. 11/747,281, filed May 11, 2007, the entire contents of which are incorporated herein by reference.

BACKGROUND

The invention relates generally to machining of an advanced material, and in particular to hybrid machining a contoured workpiece with thin walls, such as an airfoil of a gas turbine engine.

Contoured metal parts with thin walls are often difficult and costly to machine. Cost is increased when the parts are made from specialized alloys, such as titanium alloys and the like. Such parts often cannot be accurately cast without needing some final finish machining operation. Moreover, precision casting adds significant cost to even relatively simple shapes. Under certain circumstances, parts are produced from an oversized metal stock and machined to final form with a technique known as stab milling. This process is intensive with respect to total machining time, tooling cost, and often requires specialized fixturing particularly when the part has thin walls or is flimsy. Thus, it is desirable to provide an alternative method that addresses cutting time, machine time, tooling cost and fixturing.

BRIEF DESCRIPTION

Briefly, an electro machining apparatus for hybrid machining a workpiece comprises a mandrel for supporting the workpiece; a cutter mounted on an arbor, the cutter made of an electrically conductive material and having a non-conductive abrasive material; a power supply for providing electrical power to the workpiece and the cutter; a coolant supply for circulating a coolant between the cutter and the workpiece, the coolant containing means for increasing plasma discharge between the workpiece and the cutter; and means for moving the cutter relative to the workpiece to remove material from the workpiece, wherein material is removed from the workpiece operation at a relatively high rate of material using a high-speed electro-erosion (HSEE) process in which the power supply provides a first differential electrical potential and the coolant circulates at a first flow rate and a first pressure, and wherein material is removed from the workpiece at a relatively low rate using a precision electro-grinding (PEG) process in which the power supply provides a second differential electrical potential and the coolant circulates at a second flow rate and a second pressure.

In another aspect of the invention, a method of hybrid machining a workpiece, comprising the steps of:

rotating a cutter, the cutter made of an electrically conductive material and having a non-conductive abrasive material;

electrically powering a workpiece made of a titanium alloy and the cutter;

circulating a coolant therebetween, the coolant containing one or more additives for increasing plasma discharge between the workpiece and the cutter;

positioning the workpiece relative to the cutter at a predetermined depth of cut;

moving the cutter relative to the workpiece to remove material from the workpiece in a roughing pass machining operation in which material is removed from the workpiece at a relatively high rate using a high-speed electro-erosion (HSEE) process when the power supply provides a first differential electrical potential and the coolant circulates at a first flow rate and a first pressure; and moving the cutter relative to the workpiece to remove material from the workpiece in a finish pass machining operation in which material is removed from the workpiece at a relatively low rate using a precision electro-grinding (PEG) process when the power supply provides a second differential electrical potential and the coolant circulates at a second flow rate and a second pressure.

In yet another aspect of the invention, a method of hybrid machining a workpiece, comprising the steps of:

rotating a cutter made of an electrically conductive material and having a non-conductive abrasive material;

electrically powering a turbine blade and the cutter;

circulating a coolant between the turbine blade and the cutter, the coolant containing one or more additives for increasing electrical discharge between the turbine blade and the cutter;

positioning the turbine blade relative to the cutter at a first predetermined depth of cut;

moving the cutter relative to the turbine blade in a roughing pass machining operation in which material is removed from the turbine blade at a relatively high rate using a high-speed electro-erosion (HSEE) process when the power supply provides a first differential electrical potential and the coolant circulates at a first flow rate and a first pressure; and moving the cutter relative to the turbine blade in a finish pass machining operation in which material is removed from the turbine blade at a relatively low rate using a precision electro-grinding (PEG) process when the power supply provides a second differential electrical potential and the coolant circulates at a second flow rate and a second pressure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
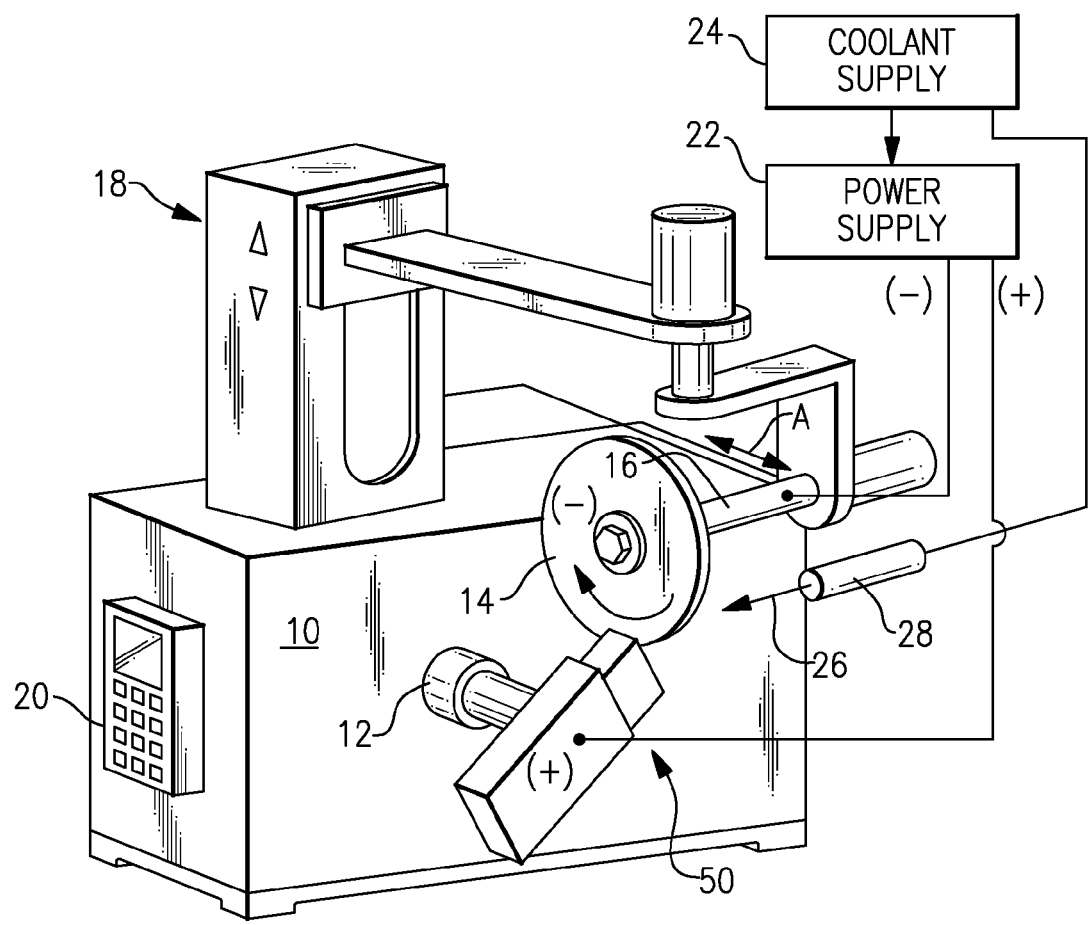
FIG. 1 is a schematic representation of an electromachining apparatus for hybrid machining a workpiece, such as a turbine blade, in accordance with an embodiment of the invention.

Referring to the drawings wherein identical reference numerals denote the same elements throughout the various views, FIG. 1 illustrates an electromachining apparatus or a hybrid machine 10 that is configured for both roughing pass machining and finish machining of a workpiece 50, particularly a contoured workpiece with thin walls.

The hybrid machine 10 is capable of using both an enhanced high-speed electro-erosion (HSEE) process and an enhanced precision electro-grinding (PEG) process in which a hybrid machine 10 uses rapid thermal ablation, mechanical abrasion, and electrochemical dissolution processes. As a result, the hybrid machine 10 is capable of producing different surface finishes and metal removal rates depending on the rate (flow and pressure) of electrolyte flushing, machine feed speed, tooling material, and the differential electrical potential between the anode and cathode.

During roughing pass machining, metal removal rates on the order of cubic inches per minute are possible with relatively high differential electrical potentials and high electrolyte flushing pressure and flows. In this first cutting regime, the machining process is dominated by electrochemical discharges that produce the high metal removal rate. During finish pass machining, metal removal rates are relatively low with relatively low differential electrical potentials and low electrolyte flushing pressure and flows. In this second cutting regime, the machining process is dominated by electrochemical reactions and periodic light surface abrasion. Thus, the hybrid machine 10 is capable of producing two different cutting regimes that are particularly useful in machining a thin-walled, delicate structure more rapidly than conventional processes, while saving money on tooling by eliminating the need for precision casting of the thin-walled, delicate structure.

In general, the hybrid machine 10 includes a supporting shaft or mandrel 12 upon which the workpiece 50 is securely mounted and supported therewith. An annular cutting wheel or cutter 14 is fixedly mounted on a rotary shaft or arbor 16 for rotation therewith during operation. A multi-axis carriage 18 is suitably configured for supporting the arbor 16 and the cutter 14 and provides driving means for moving the rotating cutter 14 relative to the workpiece 50 along the horizontal axis, A, during operation. Both the carriage 18 and the mandrel motor (not shown) are operatively joined to a digitally programmable controller 20 that is specifically configured in suitable software for controlling all operation of the electromachining apparatus or hybrid machine 10. In an exemplary embodiment, the linear speed of the rotating cutter 14 is in the range between about 3 inches per minute to about 50 inches per minute, and more preferably in the range from about 15 inches per minute to about 20 inches per minute. It will be appreciated that the invention is not limited by the linear speed of the rotating cutter, and that the rate of material removal from the workpiece may be maximized, while achieving a correspondingly rough surface finish for the machined workpiece.

Multi-axis machine tools or CNC machine tools are commonly available and may be modified for introducing the desired linear motion of the rotating cutter 14 relative to the workpiece 50. For example, the hybrid machine 10 may comprise a 3-5 axis CNC machine of a type well-known in the art. Although the workpiece 50 is held stationary as the rotating cutter 14 is suitably moved relative thereto, the workpiece 50 may also be suitably moved relative to the cutter 14.

In an exemplary embodiment, the cutter 14 is made of an electrically conductive material, such as copper, with a non-conductive abrasive material, such as alumina, ceramic, diamond, and the like, homogeneously dispersed therein. Alternatively, the abrasive material may coat the outer surface of the conductive material. The grit range of the cutter 14 is in the range from about 60 grit to about 340 grit, and more preferably in the range from about 80 grit to about 200 grit, and most preferably about 100 grit.

A suitable power supply 22, either DC constant or DC pulsed, provides means for powering or providing electrical power to the workpiece 50 and the cutter 14 during operation. The electrical power supply 22 includes a first negative (−) lead electrically joined to the cutter 14 in any suitable manner, such as by using a slip ring attached to an electrically conducting arbor. A second positive (+) lead electrically joins the power supply 22 to the workpiece 50 in any suitable manner, such as by using another slip ring with an electrically conducting mandrel, or by direct attachment to the workpiece 50.

The cutter 14 is powered as a cathode (−) and the workpiece 50 is powered as an anode (+) in the hybrid electromachining process to produce a differential electrical potential therebetween. This differential electrical potential between the cutter 14 and the workpiece 50 may be relatively higher for rapidly electrically eroding material from the workpiece 50. For example, the differential electrical potential during roughing pass machining during the first cutting regime may about 10 volts or more, and preferably about 14 volts. On the other hand, the differential electrical potential during finish machining during the second cutting regime may be relatively lower, for example, below about 10 volts to produce a smooth surface on the workpiece 50, particularly when producing a smooth finish on the thin walls of the workpiece 50.

In order to maximize material removal by the rotating cutter 14, the cutter 14 may be made as wide as practical for one-pass cutting to minimize the need for additional passes or material removal from the workpiece 50. Accordingly, the cutter 14 illustrated in FIG. 1 is in the form of a disk, and the like.

During the hybrid electromachining process, considerable heat is generated by the electrical erosion, and the cutter 14 may be rotated at a suitable speed by a corresponding motor (not shown) contained in the carriage 18 for distributing the heat load around the perimeter of the cutter 14 during operation. To minimize heat buildup, a coolant supply 24 includes a discharge nozzle 28 that provides a means for discharging a cutting fluid or liquid coolant 26 at the cutting interface between the cutter 14 and the workpiece 50 during operation. In an exemplary embodiment, the coolant 26 is pumped through the nozzle 28 and directed into the gap between the rotating cutter 14 and the workpiece 50 at a desired pressure and flow rate. The cutting fluid or coolant 26 performs the additional tasks of flushing debris from the cutting interface, while cooling both the workpiece 50 and the cutter 14.

During high metal removal rate of the first cutting regime, the flow and pressure of the coolant 26 is relatively high as compared to during the relatively low metal removal rate of the second cutting regime. For example, the pressure may be in the range between about 100 psi to about 400 psi and the flow rate may between about 5 gpm to about 50 gpm during the first cutting regime. On the other hand, during the relatively low metal removal rate of the second cutting regime, the pressure may be less than about 200 psi and the flow rate may between about 5 gpm and about 50 gpm. It will be appreciated that the pressure and flow of the coolant 26 during both the first and second cutting regimes depends on the direction at which the coolant 26 impacts the workpiece 50. As will be appreciated, force exerted by the coolant 26 on the workpiece 50 is greater when the direction of the coolant 26 is perpendicular to the surface of the workpiece 50, whereas the force exerted by the coolant 26 is less when the direction of the coolant 26 is not perpendicular to the surface of the workpiece 50.

In an exemplary embodiment, the cutting fluid or coolant 26 contains one or more additives or other means for increasing the conductivity of the coolant 26. For example, the coolant 26 may contain a halide salt, like sodium bromide, an acid, a base and the like. For example, the coolant 26 may contain about 5.4% by weight of sodium bromide. The coolant 26 may also contain a pump conditioner additive, one or more anti-rust agents, and the like. However, it will be appreciated that the invention is not limited by the additives in the coolant, and that any suitable coolant may be used that will improve plasma discharge.

In some embodiments, the cutting zone of the workpiece 50 may be fully immersed into the coolant 26 to provide superior heat dissipation and help ensure the entire cutting zone has coolant available. Immersion will contain and cool the removed debris. When the cutting zone is fully immersed, the machining process may be used with or without additional directed flushing of the cutting zone by the nozzle 28.

Figure 2:
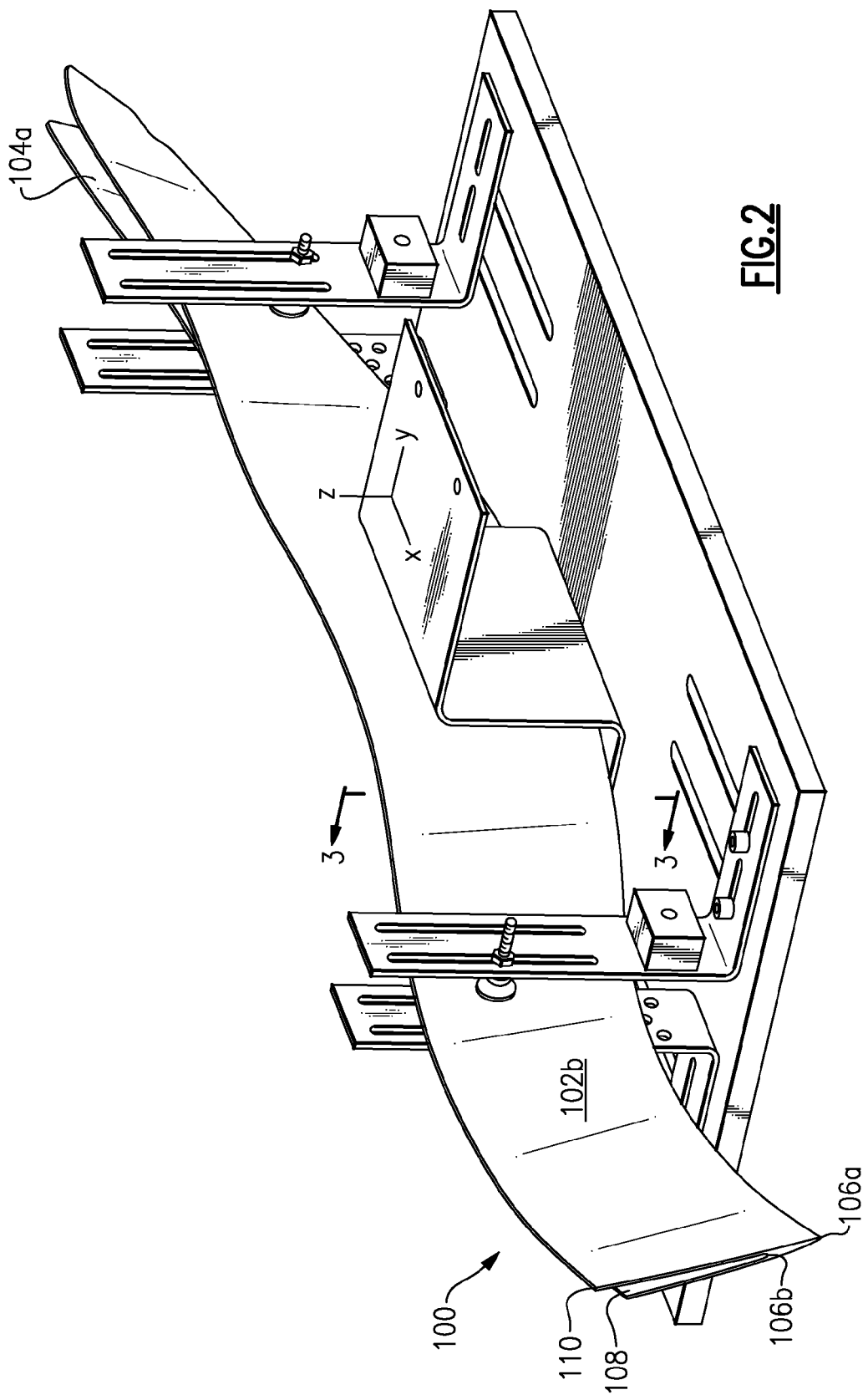
FIG. 2 is a perspective view of a turbine blade manufactured using the hybrid machine of FIG. 1 in accordance with a method of the invention.
Figure 3:
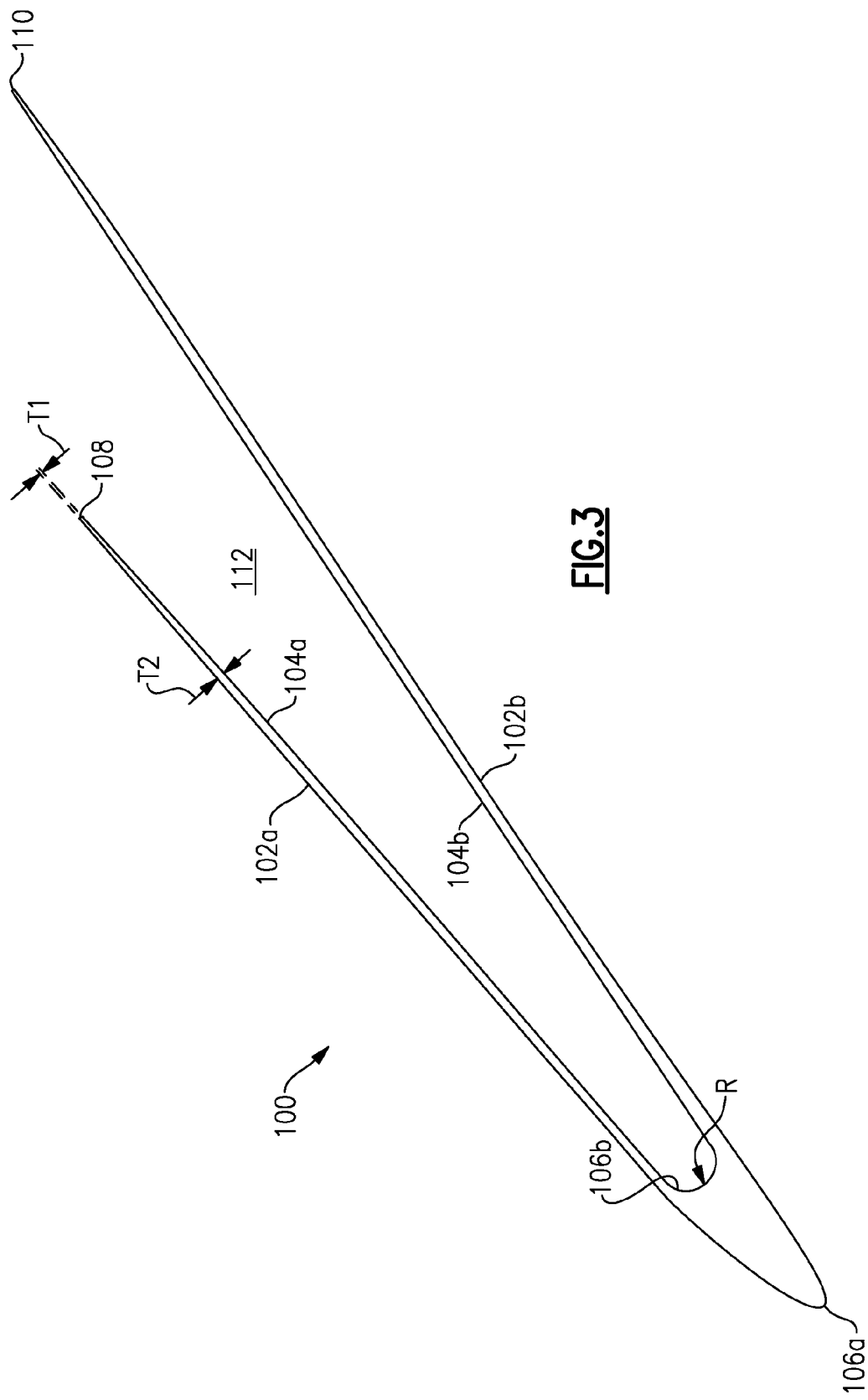
FIG. 3 is a cross-sectional view of the turbine blade taken along line 3-3 of FIG. 2.

The hybrid machine 10 can be used to form a wide variety of contoured, thin-walled parts. Referring now to FIGS. 2 and 3, the hybrid machine 10 can be used, for example, to form a turbine blade, shown generally at 100. To form the turbine blade 100, the workpiece 50, such as a turbine blank, is attached to the mandrel 12 of the hybrid apparatus 10. The workpiece 50 is positioned relative to the cutter 14 to produce a desired depth of cut. The workpiece 50 and the cutter 14 are electrically powered by the power supply, and the coolant 26 is circulated therebetween.

Then, the rotating cutter 14 is then moved relative to electrically erode or machine the workpiece 50 to perform a roughing pass machining operation using the enhanced high-speed electro-erosion (HSEE) process in which a hybrid machine 10 uses thermal, mechanical abrasion, and electrochemical dissolution processes to form the general profile of the turbine blade 100. The general profile of the turbine blade 100 comprises exterior surfaces 102a, 102b, interior surfaces 104a, 104b, an exterior nose or leading metal edge 106a, an interior surface 106b that has a radius, R, for blending the interior surfaces 104a, 104b, and tapered ends 108, 110. The interior surfaces 104a, 104b are separated by a cavity 112 therebetween. In the illustrated embodiment, the turbine blade 100 has a thickness, T1, of between about 0.002 inches to about 0.003 inches (about 0.051 mm to about 0.076 mm) at the ends 108, 110. However, the tapered ends 108, 110 may be up to about 0.010 inches (0.25 mm) in thickness. The thickness, T2, between the exterior and interior surfaces 102a, 104a and 102b, 104b is between about 0.20 inches to about 0.50 inches (about 0.5 cm to about 1.27 cm).

As mentioned above, the roughing pass machining operation provides a first cutting regime of the hybrid machine 10 in which the machining process is dominated by electrochemical discharges that produce high metal removal rate. In this first cutting regime, the differential electrical potential between the cutter 14 and the workpiece 50 is 10 volts or higher. In addition, the flow rate and pressure of the coolant 26 is in the range between about 100 psi to about 400 psi and the flow rate may between about 5 gpm to about 50 gpm. The distance of the gap between the cutter 14 and the surface of the workpiece 50 is dependent upon the desired plasma discharge field (arcing) and the size of the grit particles of the abrasive non-conducting material of the cutter 14. For example, 100 grit abrasive particles have a diameter of about 0.005 inches (0.0127 centimeter). In an exemplary embodiment, the distance of the gap is in the range between about 0.005 to 0.009 inches (0.0127 to 0.02286 centimeter).

After the general profile of the turbine blade 100 is formed using the first cutting regime, the rotating cutter 14 is then moved relative to electrically erode or machine the workpiece 50 to perform a finish pass machining operation using the enhanced precision electro-grinding (PEG) process in which a hybrid machine 10 uses both mechanical abrasion and electrochemical dissolution processes.

As mentioned above, the finish pass machining operation provides a second cutting regime of the hybrid machine 10 in which the machining process is dominated by electrochemical reactions and periodic light surface abrasion. In this second cutting regime, the differential electrical potential between the cutter 14 and the workpiece 50 is less than 10 volts. In addition, the flow rate and pressure of the coolant 26 is less than about 200 psi and the flow rate may between about 5 gpm to about 50 gpm.

In the finish pass machining operation, the general profile of the turbine blade 100 is machined to form the finished surfaces of the finished turbine blade 100. The use of the finish pass machining operation of the second cutting scheme eliminates and/or reduces the need for precision casting, which is a very costly component in producing parts composed mainly of thin-walled structures.

A series of tests were conducted on a titanium part to study the effects of various operating parameters on the results produced by using first and second cutting regimes of the hybrid machine 10. The operating parameters that were studied included the linear speed (inches per minute), the current (amperes), the concentration of sodium bromide (NaBr) in the coolant (weight percent) and the size of the heat affected zone (HAZ) (thousands of an inchmillimeters). The results of the studies are given in Table I below.

TABLE I

Effect of various parameters on the first and second cutting regimes.

| part | linear speed ipm | current A | NaBr % | HAZ mil |
|---|---|---|---|---|
| 17 | 25 | 270 | 3.6 | 10 |
| 18 | 30 | 290 | 3.6 | 15 |
| 19 | 10 | 200 | 3.6 | <5 |
| 23 | 30 | 290 | 5.4 | 15 |
| 24 | 20 | 260 | 5.4 | 10 |
| 25 | 10 | 200 | 5.4 | 10 |

As given in Table I, the use of both the high-speed electro-erosion (HSEE) process for roughing pass machining and the precision electro-grinding (PEG) process for finish pass machining produced good results for a wide variety of operating conditions. Specifically, the heat affected zone (HAZ) was an acceptable 0.015 inches or less in all test samples. In part 19, the HAZ was less than 0.005 inches in which the linear speed was 10 ipm (inches per minute), the applied potential was 14 V, (the current is not an experimental variable that we control directly and may not need mentioning) current was 200 A, and the NaBr concentration was 3.6 weight percent. The HAZ was the largest at 0.015 inches when the linear speed was the fastest at 30 ipm, even at various NaBr concentrations.

Figure 4:
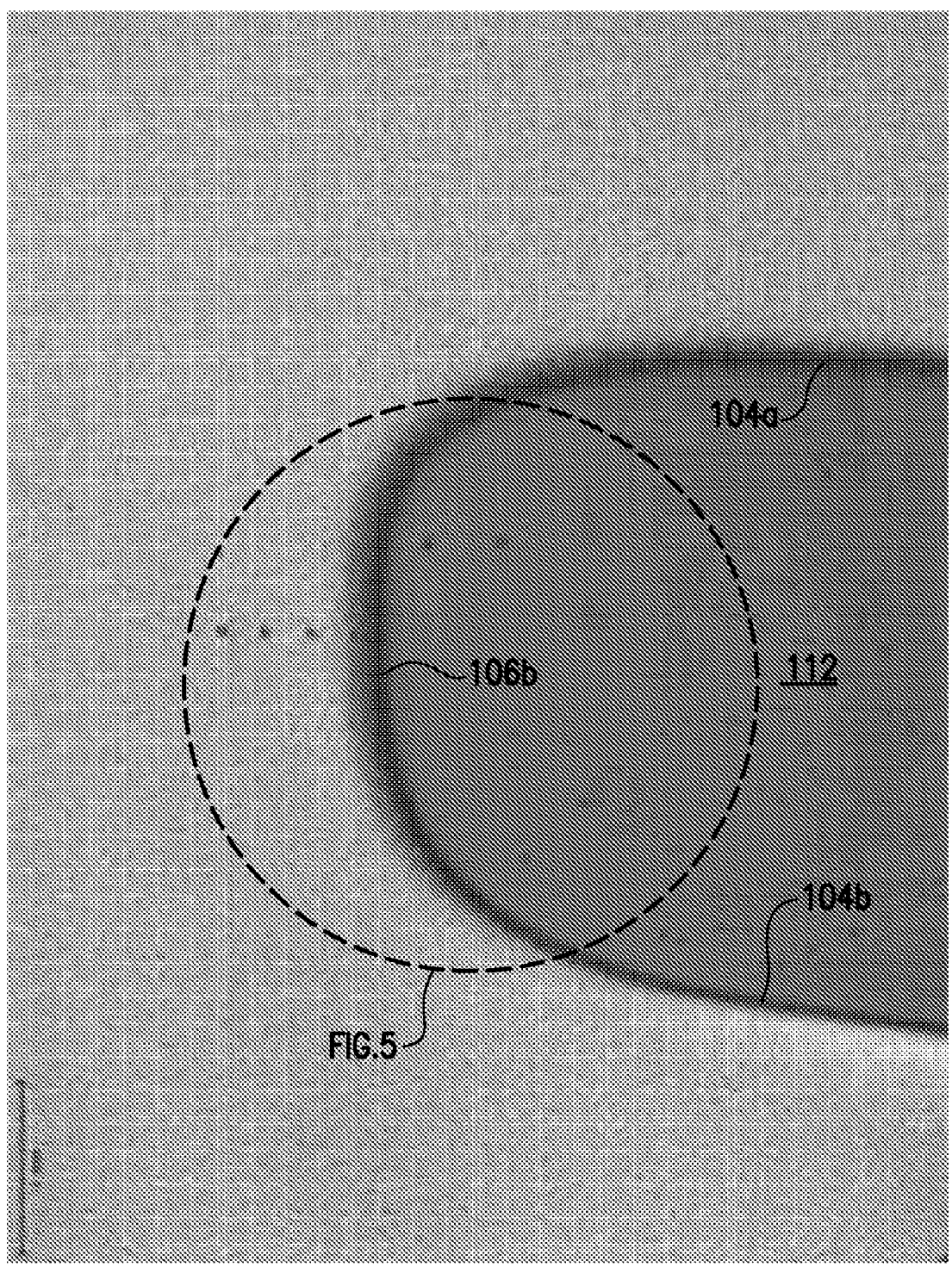
FIG. 4 is a black and white photomicrograph of an interior section of the turbine blade of FIG. 2 after using the method of the invention.
Figure 5:
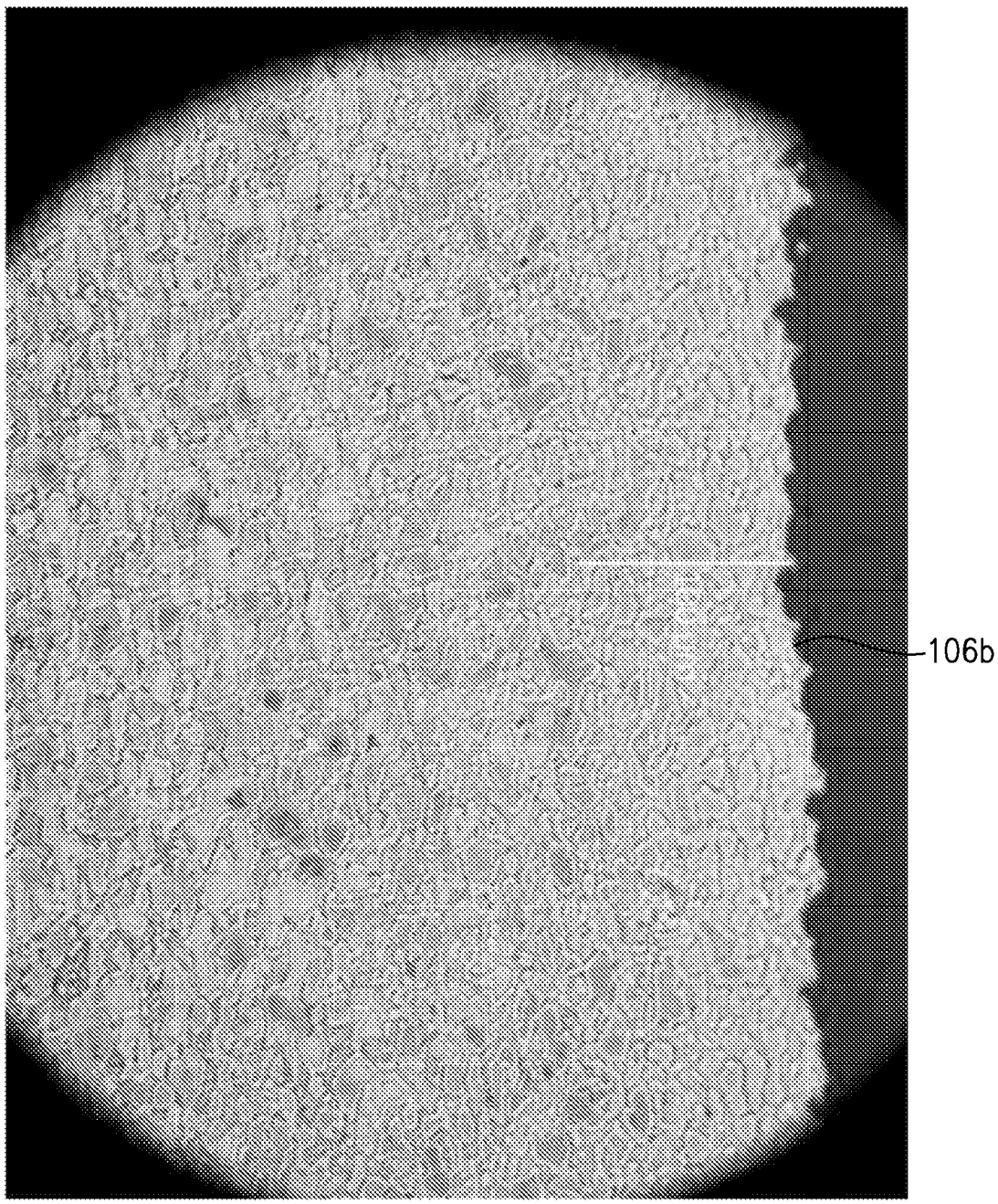
FIG. 5 is a black and white photomicrograph of the granular structure of the interior section of the turbine blade of FIG. 4.

FIGS. 4 and 5 show photomicrographs of part 25 in the vicinity of the radiused, interior surface 106. As shown in FIGS. 4 and 5, the use of both the high-speed electro-erosion (HSEE) process for roughing pass machining and the precision electro-grinding (PEG) process for finish pass machining produced good results.

In summary, the first cutting regime that uses a high-speed electro-erosion (HSEE) process by applying thermal, electro-erosion, and electrochemical machining processes at a relatively high differential electrical potential and electrolyte flushing rate provides for a combined, synergestic improvement in metal removal rates as compared to conventional processes that only apply abrasion to remove the oxide layer to promote electrochemical reaction rates. In addition, the second cutting regime that uses precision electro-grinding (PEG) process by applying mild electro-erosion, periodic abrasion, and electrochemical machining processes at a relatively lower differential electrical potential and electrolyte flushing rate eliminates the need for precision casting, which is a very costly component in producing parts that are composed mainly of thin-walled structures.

Although the illustrated embodiments have been described with reference to a turbine blade comprising titanium alloy, the invention is not limited to machining a turbine blade, but rather may be used to machine a variety of workpieces made of any metallic material that is currently machined by grinding, milling, turning, and the like. Some non-limiting examples of which the process of the invention could be used include machining plating for armor applications, turning to make shafts, machining components for heat exchangers, and the like.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of hybrid machining a workpiece, comprising the steps of:
    rotating a cutter, the cutter made of an electrically conductive material and having a non-conductive abrasive material;
    electrically powering a workpiece and the cutter with a power supply;
    circulating a coolant therebetween, the coolant containing one or more additives for increasing electrical discharge between the workpiece and the cutter;
    positioning the workpiece relative to the cutter at a predetermined depth of cut;
    moving the cutter relative to the workpiece to remove material from the workpiece in a roughing pass machining operation in which material is removed from the workpiece at a relatively high rate using a high-speed electro-erosion (HSEE) process when the power supply provides a first differential electrical potential and the coolant circulates at a first flow rate and a first pressure; and
    moving the cutter relative to the workpiece to remove material from the workpiece in a finish pass machining operation in which material is removed from the workpiece using precision electro-grinding (PEG) process when the power supply provides a second differential electrical potential and the coolant circulates at a second flow rate and a second pressure, wherein the first pressure is in a range between about 100 psi to about 400 psi, and wherein the second pressure is less than about 200 psi.

2. A method according to claim 1, wherein the first differential electrical potential is at or above about 10 volts, and wherein the second differential electrical potential is below about 10 volts.

3. A method according to claim 1, wherein the workpiece comprises a turbine blade.

4. A method according to claim 1, wherein the grit range of the non-conductive abrasive material is from about 60 to about 340 grit.

5. A method according to claim 1, wherein the means for increasing electrical discharge comprises one or more additives in the coolant.

6. A method according to claim 5, wherein the one or more additive comprises sodium bromide.

7. A method of hybrid machining a workpiece, comprising the steps of:
    rotating a cutter made of an electrically conductive material and having a non-conductive abrasive material;
    electrically powering a turbine blade and the cutter with a power supply;
    circulating a coolant between the turbine blade and the cutter, the coolant containing one or more additives for increasing electrical discharge between the turbine blade and the cutter;
    positioning the turbine blade relative to the cutter at a first predetermined depth of cut;
    moving the cutter relative to the turbine blade in a roughing pass machining operation in which material is removed from the turbine blade at a relatively high rate using a high-speed electro-erosion (HSEE) process when the power supply provides a first differential electrical potential and the coolant circulates at a first flow rate and a first pressure; and
    moving the cutter relative to the turbine blade in a finish pass machining operation in which material is removed from the turbine blade using precision electro-grinding (PEG) process when the power supply provides a second differential electrical potential and the coolant circulates at a second flow rate and a second pressure, wherein the first pressure is in a range between about 100 psi to about 400 psi, and wherein the second pressure is less than about 200 psi.

8. A method according to claim 7, wherein the first and second flow rates are in a range between about 5 gpm to about 50 gpm.

9. A method according to claim 7, wherein the first differential electrical potential is at or above about 10 volts, and wherein the second differential electrical potential is below about 10 volts.

10. A method according to claim 7, wherein the grit range of the non-conductive abrasive material is from about 60 to about 340 grit.

11. A method according to claim 7, wherein the means for increasing electrical discharge comprises one or more additives in the coolant.

12. A method according to claim 11, wherein the one or more additive comprises sodium bromide.

13. A method of hybrid machining a workpiece, comprising the steps of:
    rotating a cutter, the cutter made of an electrically conductive material and having a non-conductive abrasive material;
    electrically powering a workpiece and the cutter with a power supply;
    circulating a coolant therebetween, the coolant containing one or more additives for increasing electrical discharge between the workpiece and the cutter;
    positioning the workpiece relative to the cutter at a predetermined depth of cut;
    moving the cutter relative to the workpiece to remove material from the workpiece in a roughing pass machining operation in which material is removed from the workpiece at a relatively high rate using a high-speed electro-erosion (HSEE) process when the power supply provides a first differential electrical potential and the coolant circulates at a first flow rate and a first pressure; and moving the cutter relative to the workpiece to remove material from the workpiece in a finish pass machining operation in which material is removed from the workpiece using precision electro-grinding (PEG) process when the power supply provides a second differential electrical potential and the coolant circulates at a second flow rate and a second pressure, wherein the first and second flow rates are in a range between about 5 gpm to about 50 gpm.

14. A method according to claim 13, wherein the first pressure is in a range between about 100 psi to about 400 psi, and wherein the second pressure is less than about 200 psi.

15. A method according to claim 13, wherein the first differential electrical potential is at or above about 10 volts, and wherein the second differential electrical potential is below about 10 volts.

16. A method according to claim 13, wherein the grit range of the non-conductive abrasive material is from about 60 to about 340 grit.

17. A method according to claim 13, wherein the means for increasing electrical discharge comprises one or more additives in the coolant.

18. A method according to claim 17, wherein the one or more additive comprises sodium bromide.

19. A method according to claim 13, wherein the workpiece comprises a turbine blade.

* * * * *